(12) United States Patent
Prabhu

(10) Patent No.: US 6,981,104 B2
(45) Date of Patent: Dec. 27, 2005

(54) METHOD FOR CONDUCTING CHECKPOINTING WITHIN A WRITEBACK CACHE

(75) Inventor: Manohar K. Prabhu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 543 days.

(21) Appl. No.: 10/195,090

(22) Filed: Jul. 12, 2002

(65) Prior Publication Data

US 2004/0010663 A1 Jan. 15, 2004

(51) Int. Cl.[7] ............................................. G06F 12/00
(52) U.S. Cl. ..................... 711/144; 711/129; 711/161
(58) Field of Search ...................... 711/135, 143, 144

(56) References Cited

U.S. PATENT DOCUMENTS

| | | | | |
|---|---|---|---|---|
| 6,418,515 B1 * | 7/2002 | Kurosawa | .................. | 711/135 |
| 6,490,657 B1 * | 12/2002 | Masubuchi et al. | ......... | 711/135 |
| 6,609,136 B2 * | 8/2003 | Bamford et al. | ............ | 707/202 |
| 6,622,263 B1 * | 9/2003 | Stiffler et al. | ................. | 714/13 |
| 6,636,941 B1 * | 10/2003 | Gold et al. | .................. | 711/112 |
| 6,678,704 B1 * | 1/2004 | Bridge et al. | ............... | 707/202 |
| 6,678,787 B2 * | 1/2004 | Petruschka et al. | ......... | 711/112 |
| 6,691,245 B1 * | 2/2004 | DeKoning | ..................... | 714/6 |
| 6,766,428 B2 * | 7/2004 | Saulsbury et al. | .......... | 711/154 |
| 6,772,296 B1 * | 8/2004 | Mathiske | ..................... | 711/138 |
| 2002/0073276 A1 * | 6/2002 | Howard et al. | ............. | 711/113 |
| 2003/0005265 A1 * | 1/2003 | Barowski et al. | ........... | 712/218 |

OTHER PUBLICATIONS

Handy, "The Cache Memory Book", 1998, Academic Press, 2nd ed, 51-56.*

* cited by examiner

Primary Examiner—Mano Padmanabran
Assistant Examiner—Paul Baker
(74) Attorney, Agent, or Firm—Richard P. Lange (57) ABSTRACT

A method for conducting checkpointing within a writeback cache having a cache memory with at least two memory banks. In one embodiment, a first pointer is set to indicate which cache entry of the at least two memory banks contains current data. A second pointer is set to indicate which cache entry of the at least two memory banks contains checkpoint data. Checkpointing is performed by selectively controlling said second pointer or said first pointer.

29 Claims, 9 Drawing Sheets

METHOD FOR CONDUCTING CHECKPOINTING WITHIN A WRITEBACK CACHE

FIELD OF THE INVENTION

Embodiments of the present claimed invention relate to computer systems. More particularly, embodiments of the present claimed invention relate to computer systems that utilize checkpointing within a writeback cache.

BACKGROUND ART

A cache, main memory, or other temporarily private data storage generally implements a particular write policy or strategy. "Temporarily private data storage" refers to a component of a computer system that temporarily maintains some particular data in a private state (e.g., some portion of the computer system can see particular data while another portion of the computer system cannot see that data). Subsequently, the particular data can be made available to another portion of the computer system. A scratch pad memory of a processor is an example of temporarily private data storage.

Examples of write strategies include a write through strategy and a write back strategy. The simplest case is the write through strategy. In a write through cache, a write operation from the processor leads to the transfer of the data to a slower level in a memory hierarchy, even with a cache hit. Moreover, an entry in the write through cache may be written to and updated.

In a write back cache, on a write operation from the processor, only the entry (on a cache hit) in the write back cache is written to and updated while the content of another, slower level of memory (e.g., the next slower level of cache or the main memory) remains unaltered. A "dirty" entry refers to an entry (e.g., a line or page and its associated tag or other state information) that has been written to and updated but has not yet been updated in a slower level of memory. A dirty cache entry is subsequently copied to the main memory or to another, slower level of cache or to the main memory in order to update the content there.

Generally, dirty cache entries are copied to another, slower level of cache or the main memory after an explicit instruction to clean (or flush) the write back cache, or in certain cases of capacity, conflict, or coherence misses. Some fault-tolerant computer systems cleanse cache memories of dirty entries as part of a checkpoint process. In a checkpoint process, the state of the computer system is periodically recorded (stored) at checkpoint boundaries. In the event of a fault, the computer system can backtrack to a previous state that existed prior to the fault, thereby losing only the time invested between the most recent checkpoint boundary and the time that the fault occurred.

Accordingly, information sufficient to restore the computer system to a state equivalent to the state that existed prior to the fault is typically stored (for example, a state at which the computer system can satisfactorily restart computation without including incorrect execution, data or the like). One method of accomplishing this is to cleanse the cache memory of dirty entries at each checkpoint boundary. The dirty entries can be written back to main memory or other storage and thereby preserved.

A system conducting checkpointing will typically continuously repeat two phases, a computation phase, and a checkpoint phase. During the checkpoint phase, the checkpoint will be constructed. In the event of a system failure that can be corrected via the use of the checkpoint, the system will conduct a recovery phase and then possibly continue, perhaps in a reconfigured or degraded state, either with or without further checkpointing.

During the checkpoint phase, execution of user applications is typically not possible. The common requirement to clean the dirty cache entries requires significant computer system processing resources. This typically causes execution of user applications to stall until the checkpoint can complete. In addition, work should not be done while the previous work is being recorded in order to ensure the previous work is not commingled with any present work during the checkpoint phase. Thus, it is typically not possible during the checkpoint phase to execute user applications. Additionally, cleaning of caches typically causes a condition of memory bandwidth saturation. The condition of memory bandwidth saturation can generally be only partially alleviated by methods of preemptive cache cleaning, resulting in a longer checkpoint phase and a reduced computation-phase duty cycle.

DISCLOSURE OF THE INVENTION

A method and apparatus for conducting checkpointing within a writeback cache system that includes at least two memory banks is disclosed. In one embodiment, a first pointer is set to indicate which cache entry of the at least two memory banks contains current data. A second pointer is set to indicate which cache entry of the at least two memory banks contains checkpoint data. Checkpointing is performed by selectively controlling said second pointer or said first pointer.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should be understood as not being drawn to scale except if specifically noted.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

As an overview, the various embodiments of the present invention are used for making and storing a copy of a state equivalent to the state of a computer system at the time of completion of a checkpoint cycle (typically, the latest checkpoint cycle). In one embodiment, this may be achieved by saving a portion of the checkpointed state in a fault-tolerant memory (e.g. cache memory 111 of FIGS. 1 and 2).

In general, the process of checkpointing allows a computer system to backup information in a manner that will retain the information after a fault occurs. Normally, there are two phases to a checkpointing operation. The phases are referred to herein as the computational phase, and the checkpoint phase. These phases make up what is referred to herein as a checkpoint cycle. Additionally, a recovery phase (e.g., a rollback) is used to backtrack to a state that existed prior to a fault.

An entry in a cache will contain a block of data, also referred to herein as a cache line. Possibly associated with a cache line will be a combination of one or more of a cache tag, a valid/invalid indicator, a dirty/clean indicator, cache line replacement information (e.g. least recently used (LRU) or pseudo-LRU information), counters or other associated state information. Herein a block of cache data is referred to in combination with all its associated tags, indicators, counters, and state information as a cache entry. Alternatively a cache line entry is referred to as a cache line (e.g., cache block), tags and other associated state information. A cache tag is used to identify that a cache entry matches the requested address, since many addresses alias to the same cache entry storage. The valid/invalid indicator indicates whether an associated cache entry contains valid data. A dirty/clean indicator is used in a writeback cache to indicate whether an associated cache entry contains dirty data as described herein. Cache entry replacement information is used to select which cache entry to replace when replacement of an entry becomes necessary in a set-associate cache due to the finite storage capacity of the cache. Counters can be used to record an important statistic, such as the number of accesses to a cache entry or the time at which it was accessed. Other associated state information is information stored that is related to the particular cache entry.

One embodiment of the present invention pertains to a cache enabled for checkpointing which possesses at least two identical banks, each bank containing N cache entries. Two extra sets of N pointers are also utilized. The first set comprises pointers for the current data and the second set comprises pointers for the checkpoint data. Each current pointer will indicate, for a choice between corresponding entries, one in each bank, which of the at least two banks contains the current cache entry for reads. Each checkpoint pointer will indicate, for a choice between corresponding entries, one in each bank, which of the at least two banks contains the data that existed at the time the last checkpoint was constructed. Additionally, although a single current pointer and a single checkpoint pointer are described, the present embodiment is well suited to the use of multiple pointers for indicating the current and/or checkpoint entries. The pointer may be a single bit or a group of bits. Furthermore, the pointer may be a demultiplexor, circuit, algorithm, or the like.

The mechanism by which the cache is controlled will be referred to herein as the cache controller. In one embodiment, the cache is controlled by the attached processor, making the processor and its associated algorithms a cache controller. In another embodiment, the cache is controlled by a circuit or an algorithm or both that are not a portion of the processor and its associated algorithms.

Checkpointing of the cache is conducted when the cache controller receives a checkpointing signal from a checkpoint controller, perhaps external to the cache and/or external to a computer system. The cache may first need to wait for checkpointing activity from its associated processor and/or various levels of the memory system to complete. For example, the processor may first need to flush its instruction pipeline and save its registers and internal state to its caches, and faster or slower caches may need to clean themselves. At the appropriate moment, the checkpoint-enabled cache will simply atomically (e.g., an operation that must be performed entirely or not at all) set its checkpoint pointers equal to its current pointers, and this will form a checkpoint of the cache at the current moment. For example, if failure prevents a checkpoint to be processed to completion, the system will be rolled back to the start of the checkpointing operation or to the previously stored checkpoint.

At the conclusion of each checkpoint phase, the checkpoint pointer(s) all point to the same bank for each choice between cache entries as the current pointer(s). This causes the checkpoint to be built to the current state of the caches. After this and prior to constructing the next checkpoint, the first time for each cache entry that its contents (line or tags or perhaps optionally other associated state information) may change for any reason, including update, eviction, replacement, or invalidation, the new data is placed in the corresponding entry in the other bank, and the current pointer is set to point to the other entry. In this manner, the checkpoint will be preserved while modifications to the current cache entry will be formed in the non-checkpoint lines.

It should be noted that in general the current cache entries and the checkpoint cache entries may be intersecting sets that are identical at the end of each checkpoint phase. Also, the current cache entries, like the checkpoint cache entries, will tend to be evenly distributed between both cache banks. Thus, the checkpoint will exist in one of the two banks for each entry of the cache. Each current cache entry may overlap with the checkpoint cache entry if it has remained unchanged since the checkpoint, but will exist in the other bank's entry if any changes have occurred.

Recovery of the cache by rolling back to the previous checkpoint is enacted by atomically setting all the current pointers equal to the checkpoint pointers at the appropriate moment. In one embodiment, the appropriate moment is indicated by a portion of the system internal to and/or external to processor 110.

Thus, the present invention provides, in various embodiments, a method for conducting checkpointing within a writeback cache by selectively controlling the states of pairs of pointers. It further allows for more computation time by reducing the stall in processing of user applications during the process of checkpointing (e.g., during the checkpoint phase). In addition, the present invention also provides a method for conducting checkpointing within a writeback cache which reduces the activity between the cache and main memory during a checkpoint, thereby reducing the memory bandwidth saturation. The present invention further provides a method for conducting checkpointing within a writeback cache which meets the above needs and which is compatible with existing computer architectures.

Figure 1:
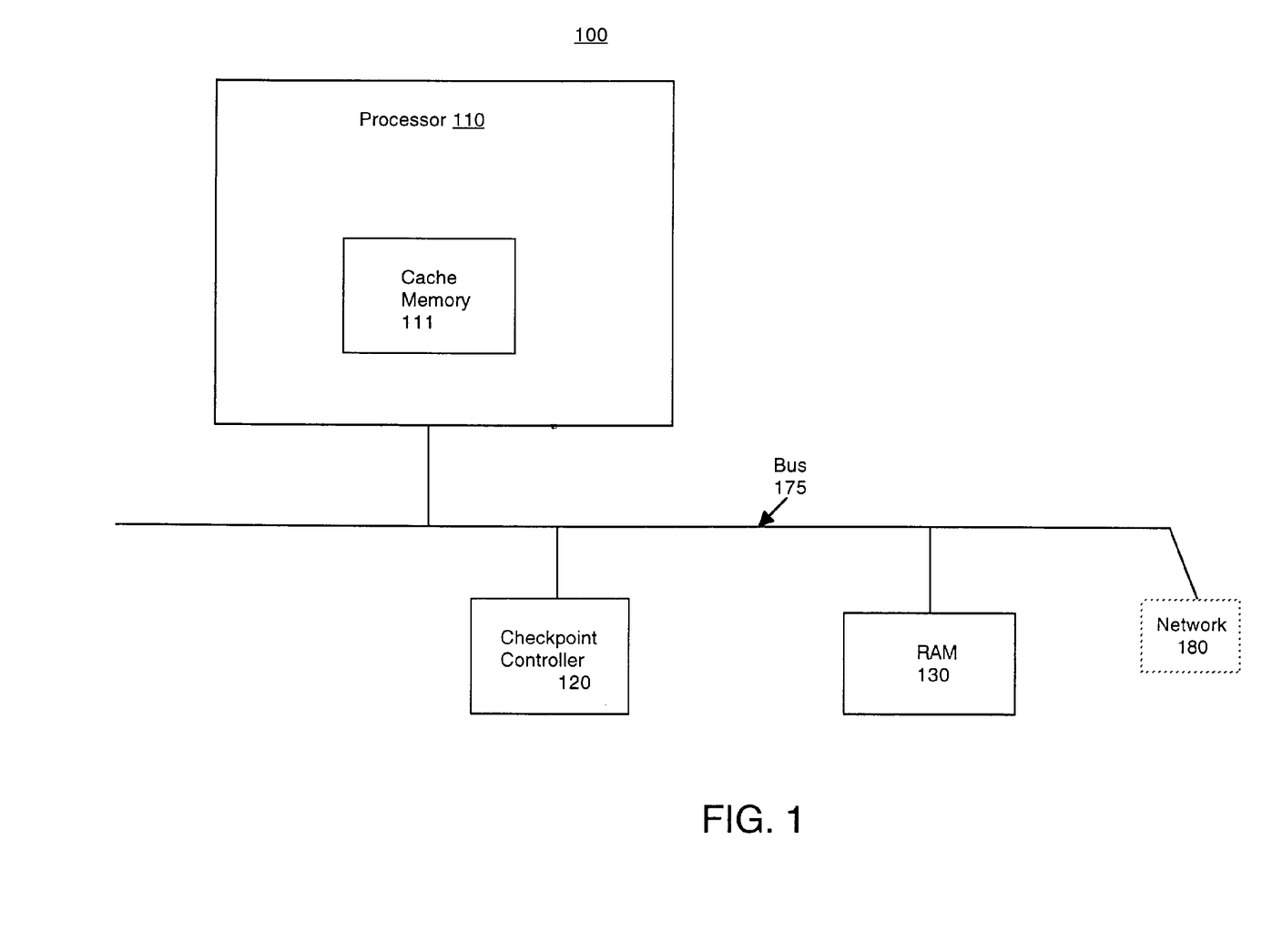
FIG. 1 is a block diagram of portions of an exemplary computer system that includes a writeback cache system in accordance with an embodiment of the present invention.

With reference now to FIG. 1, a computer system 100 that includes a processor 110 is shown. Although one processor is shown, the present embodiment is well adapted for the utilization of more than one processor. Furthermore, computer system 100 may include other components such as, for example, a display device, an alpha-numeric input device, a cursor control device, a signal input device and/or output communication device, volatile and/or non-volatile memory, etc.

Computer system 100 is shown to include cache memory 111. Additionally, cache memory 111 can comprise a multiple-level cache system having a plurality of cache levels such as a level 1 cache, a level 2 cache, a level 3 cache, etc. Furthermore, each cache level may vary in size and/or speed. Alternatively, cache memory 111 can be a single-level cache system. Cache memory 111 may comprise a combination of one or more of a multi-level cache system, unified cache, split instruction and data caches, a direct mapped cache, a set associate cache, or the like. In one embodiment, cache memory 111 is a fault-tolerant cache, capable of recovering from a single point of dynamic failure within itself (e.g. implementing a form of error correction code (ECC)). Although the present invention is described in the context of a write back strategy, it is also well suited for use with a write through strategy as long as at least one portion of the cache uses the writeback strategy. Additionally, the cache may not be fault-tolerant, or may be fault-tolerant to multiple points of dynamic failure.

The timing of each checkpoint cycle is controlled by checkpoint controller 120. That is, checkpoint controller 120 is the device that instructs computer system 100 to perform a checkpointing operation. Accordingly, at a point in the checkpointing cycle, checkpoint controller 120 may cause processor 110 to cease processing user applications. Processor 110 may possibly need to store its internal registers that define its state in cache memory 111 and/or RAM 130. Additionally, the caches may need to clean themselves of dirty cache entries. Although checkpoint controller 120 is shown as a separate device, checkpoint controller 120 may be a part of processor 110 or other portions of system 100. Alternatively, checkpoint controller 120 may be separate from system 100.

Referring still to FIG. 1, although the checkpointing system has been shown to reside in a single computing system 100, portions of the checkpointing system may reside in a separate computer system that shares one or more of temporarily private data, random access memory (RAM) 130, checkpoint controller 120, and control signals and data signals that interact with cache 111, this sharing occurring with other processor(s) or computer systems over a computer network 180 or any other connection. Additionally, cache memory 111 may be coupled with bus 175 in a manner such that in case of failure of processor 110 and/or cache controller 150, a secondary device coupled to cache memory 111 via bus 175 or via some other connection may be utilized to recover the data stored in cache memory 111.

Figure 2:
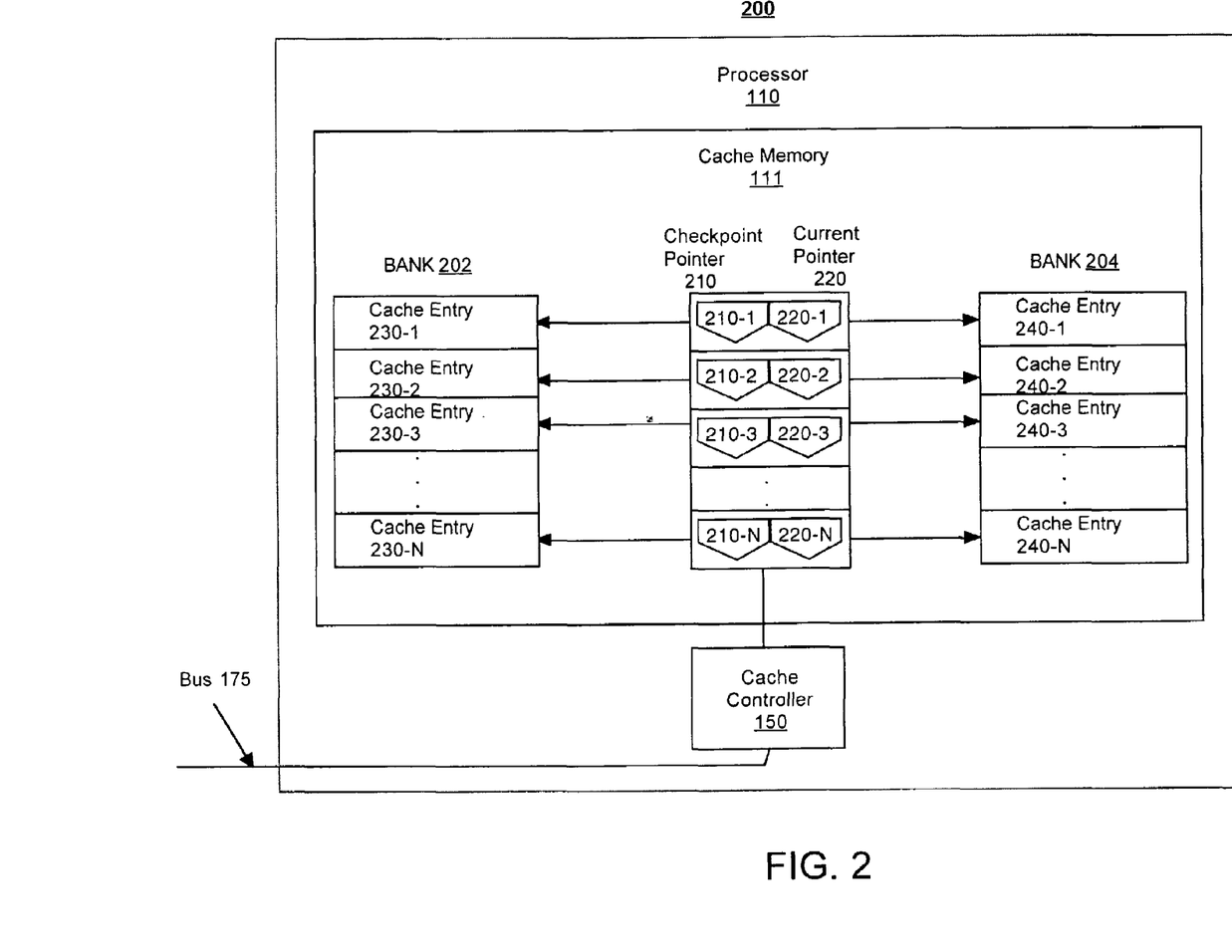
FIG. 2 is a block diagram of a writeback cache system that includes two memory banks in accordance with an embodiment of the present invention.

Referring now to FIG. 2, an exemplary version of processor 110 from computer system 100 is shown in more detail. In one embodiment, cache memory 111 includes two virtually identical cache memory banks (e.g. cache memory bank 202 and cache memory bank 204). Each bank includes N cache entries, specifically entries 230 and entries 240. Additionally, in one embodiment, for each of the N pairs of matching cache entries (e.g., 230-1 and 240-1), there are at least two pointers, the first being a current pointer (e.g., 220-1) and the second being a checkpoint pointer (e.g., 210-1). In another embodiment, no pointers or a single pointer may be used for each of the N pairs of matching cache entries. Although two banks are shown, the present invention is well suited to the use of more than two banks. For example, the use of more than two banks could allow the preservation of multiple checkpoints constructed at different times. Further, the present invention is well suited to having a number of current cache pointers 220 greater or less than N, the number of pairs of matching cache entries. Likewise, the present invention is well suited to having a number of checkpoint cache pointers 210 greater or less than N, the number of pairs of matching cache entries. It is further appreciated that one embodiment is illustrative of a single checkpointing procedure and that multiple checkpointing procedures and/or multiple varieties of checkpoints may take place. In one embodiment, this method is applied to the entire cache memory 111. However, in another embodiment, this method is applied to only a portion of the cache memory 111. It is further appreciated that the processes described herein are exemplary.

Cache memory 111 and/or cache controller 150 selectively allow processor 110 access to entries within the cache memory banks. In one embodiment, cache controller 150 is capable of functioning independently of processor 110 with which it is associated. Thus, if processor 110 should become non-functional, access to the checkpointed data is still possible for an outside component by utilizing cache controller 150. In another embodiment, outside components may have direct access to cache memory 111 via bus 175 or via another connection to cache memory 111 without utilizing cache controller 150. In one embodiment, examples of an outside component include test hardware, repair hardware, measurement hardware, inspection hardware, and the like, which is not typically a part of computer system 100.

In one embodiment, cache controller 150 or cache memory 111 or both-allow communication of all entries and the current and checkpoint pointers in cache memory 111 to a portion of computer system 100 other than its own processor(s) or faster/slower cache(s). In another embodiment, cache controller 150 or cache memory 111 or both allow communication of a dirty cache line and its associated tag from cache memory 111 to a portion of computer system 100 other than its own processor(s) or faster/slower cache(s). The communication from cache memory 111 could be via response to an exhaustive query of all possible lines, tags, and pointers. Alternatively, cache memory 111 could be made to clean itself of all dirty lines and tags for the entries pointed to by the checkpoint pointers, the current pointers, or both. Alternatively cache memory 111 could be made to output its entire contents. Support for at least one of these methods of communication from caches is often present in computer systems that are capable of maintaining multiprocessor coherence protocols. As an example, access of data in cache memory 111 could be conducted via one or more of the buses that connect the cache to the faster or slower levels of the memory hierarchy. In particular, in one embodiment, control could be exerted by system bus 175, which, for example, could be controlled by other processors or controllers within the system.

In the event of a transient or permanent failure of a combination of one or more of the portions comprising computer system 100, including processor 110, cache controller 150, and cache memory 111, cache memory 111 can be made to communicate all or a portion of its dirty lines, tags and current and checkpoint pointers to the rest of computer system 100 or other computer systems connected to computer system 100, perhaps through network 180. This may be done utilizing one or a combination of the portions of computer system 100 including processor 110, cache controller 150, cache memory 111 and bus 175, or it may use components that are not a part of computer system 100. In one embodiment, communication of data from cache memory 111 in the event of the aforementioned failure may be exercised by bus 175 in a manner unaffected by a failure of processor 110. In another embodiment, communication of data from cache memory 111 in the event of the aforementioned failure may be exercised by bus 175 in a manner unaffected by a failure of cache controller 150. In another embodiment, communication of data from cache memory 111 in the event of the aforementioned failure may be exercised by bus 175 in a manner unaffected by a failure of both processor 110 and cache controller 150. In another embodiment, communication of data from cache memory 111 in the event of the aforementioned failure may be exercised by a separate system external to computer system 100 in a manner unaffected by a failure of processor 110. In another embodiment, communication of data from cache memory 111 in the event of the aforementioned failure may be exercised by a separate system external to computer system 100 in a manner unaffected by a failure of cache controller 150. In another embodiment, communication of data from cache memory 111 in the event of the aforementioned failure may be exercised by a separate system external to computer system 100 in a manner unaffected by a failure of both processor 110 and cache controller 150. The data communicated from cache memory 111 can allow recovery of an equivalent state to the state of computer system 100 that existed prior to the failure (e.g., the last checkpointed state) in spite of the existence of a failed portion of computer system 100.

Figure 3:
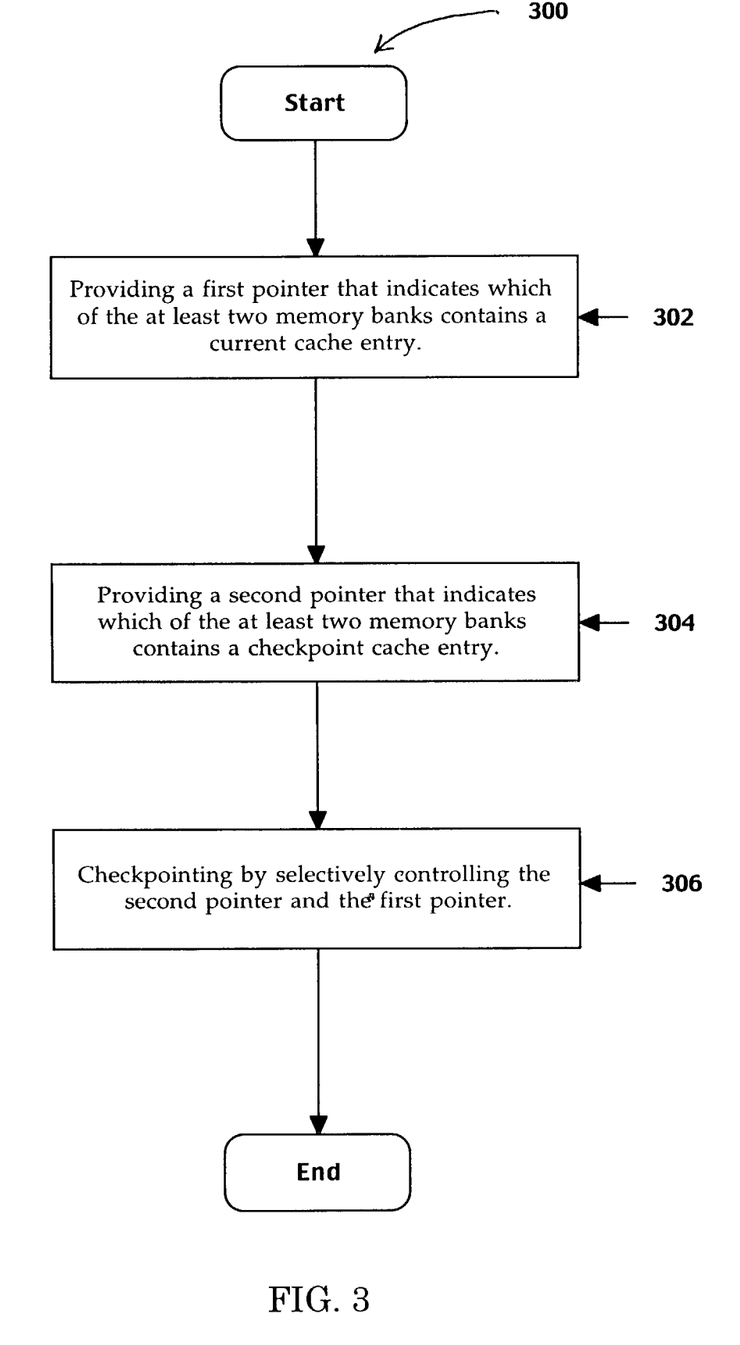
FIG. 3 is a flowchart of steps in a method for conducting checkpointing of data within a writeback cache system in accordance with an embodiment of the present invention.

With reference now to FIG. 3, a flow chart of the steps in a method for conducting checkpointing within a writeback cache is shown, in accordance with one embodiment of the present invention. At step 302 of FIG. 3, a first pointer is provided that indicates which cache memory bank contains a current cache entry. For example, the first pointer may comprise a single bit that can be updated to indicate which of cache memory banks 202 and 204 contains a current cache entry. The use of a single bit in the present embodiment is merely for purposes of brevity and clarity.

With reference now to step 304 of FIG. 3, a second pointer is provided that indicates which of the at least two memory banks contains a checkpointed cache entry. In one embodiment, the second pointer may comprise a single bit that can be updated to indicate which of cache memory banks 202 and 204 contains a checkpointed cache entry. The use of a single bit in the present embodiment is merely for purposes of brevity and clarity.

With reference now to FIGS. 2 and 3, two cache memory banks 202 and 204 are used for performing method 300. The purpose of maintaining two virtually identical banks within a cache system is to reduce the time required for checkpointing. Specifically, rather than requiring the caches to clean dirty data to a slower cache, main memory, disk, network storage or the like, one embodiment allows cache memory 111 to checkpoint within itself. With the ability to checkpoint within cache memory 111, computer system 100 is alleviated of much of the memory writeback activity and the associated stall time normally caused by cleaning the dirty cache entries. Further, bandwidth saturation is reduced, assisting bus 175 to remain within acceptable operating bounds.

Referring still to FIGS. 2 and 3, each bank maintains a matching number of cache entries. The matching number of cache entries allows a current entry to reside in one bank and a backup, or checkpoint, entry to reside in another. For example, if 230-1 and 240-1 are matching cache entries within the two banks, entry 230-1 may maintain a current entry of data while entry 240-1 maintains a backup or checkpointed entry. Therefore, if any type of error occurs in computer system 100, a backup of the data, as recorded at the previous checkpoint, is maintained.

For example, current pointer 220-1 and checkpoint pointer 210-1 maintain the status of entry 230-1 and entry 240-1. That is, current pointer 220-1 may indicate either entry 230-1 or entry 240-1 as the current entry, while checkpoint pointer 210-1 may indicate either entry 230-1 or entry 240-1 as the checkpointed entry.

Thus, each current pointer 220 will indicate, for a corresponding set of entries 230 and 240 in the cache banks 202 and 204, which one of the banks contains the current cache entry. Similarly, each checkpoint pointer 210 will indicate, for a corresponding set of entries 230 and 240 in the cache banks, which one of the banks contains the data that existed at the time the last checkpoint was constructed. For example, current pointer 220-3 will point to one of entries 230-3 and 240-3. Likewise checkpoint pointer 210-3 will point to one of entries 230-3 and 240-3. Although both current pointers and checkpoint pointers are illustrated within cache memory 111, they are capable of being maintained outside cache memory 111.

In one embodiment, upon initialization, both bank 202 and bank 204 have their respective lines marked to an invalid state. Furthermore, the checkpoint pointers do not need to be set to point to any particular entries. The current pointers are made to point to the same entries as the checkpoint pointers. Thus, cache memory 111 is in a fully invalidated and checkpointed state, ready to receive information.

With reference still to FIG. 3, during the reception of data, the bank not pointed to by the checkpoint pointer, on an entry-by-entry basis is used to store the incoming data. For example, if the checkpoint pointer for entries 230-1 and 240-1 is pointing to entry 240-1 in bank 204, then if processor 110 attempts to store new data to one of entries 230-1 or 240-1, then the data will be stored in entry 230-1 of bank 202. Furthermore, current pointer 210-1 will then be set to point to the new data in cache entry 230-1 in bank 202.

Other ways that comprise the first time the contents of a cache entry are changed (such as updated, evicted, replaced, invalidated, or the like) could alternately cause the same action. In this manner, in a similar example in which the checkpoint pointer for entries 230-1 and 240-1 is pointing to entry 240-1 in bank 204, then the checkpoint data will be preserved in cache entry 240-1 while the current data is formed in cache entry 230-1. Thus, it is appreciated that current cache entries and checkpoint cache entries may be different at the end of each computational phase, and the process of checkpointing will set the checkpoint pointer equal to the current pointer.

With reference still to step 302 and 304 of FIG. 3 and also to FIG. 2, after many cycles of computation and checkpoint phases are completed, the current cache entries and the checkpoint cache entries will tend to be evenly distributed between both cache banks. This is because, if a cache entry has remained unchanged since the previous checkpoint, the current cache entry may overlap with the checkpoint cache entry. However, if a change has occurred in the cache entry, then the current cache entry will be in a different bank than the checkpoint cache entry.

In one embodiment, each checkpoint pointer has a connection that allows it to be set equal to the corresponding current pointer in an atomic action, for example, within a single cache clock cycle. Further, the current pointer has a connection which allows it to be set equal to the corresponding checkpoint pointer in an atomic action, for example, within a single cache clock cycle.

Alternatively, in another embodiment, a current pointer, a checkpoint pointer, or both cannot be reset within a single cycle. In this case, further extensions to cache memory 111 may optionally be added to ensure atomic checkpointing and fault tolerance during the checkpoint phase and during the rollback or recovery phase or both. These could include, for example, having an extra bank of temporary pointers similar to the bank of checkpoint pointers and the bank of current pointers, the extra bank having an additional start-copy indicator and an additional end-copy indicator, and also having a method for using these extensions to indicate the initiation and the conclusion of an idempotent action that must be completed atomically, namely that of setting one bank of pointers equal to the other bank of pointers. The additional bank of temporary pointers could be used to save the contents of the checkpoint pointers prior to the process of updating the checkpoint pointers during the checkpoint phase.

With reference now to step 306 of FIG. 3, a checkpoint of data is performed by selectively controlling the second pointer and the first pointer. In general, the ability to update both the checkpoint pointer and the current pointer may be controlled either internal to, or external of, the cache. In addition, cache memory 111 allows selection of the bank to be read or written on the basis of current pointers or on the basis of checkpoint pointers or a combination thereof (e.g. for use in the recovery phases or for purposes of debugging).

With reference now to FIGS. 4–7, the following flowcharts are representative of one exemplary embodiment of the present invention. Accordingly, there are many possible variations of the exemplary flowcharts which would be apparent to one skilled in the art. The exemplary flowcharts may be treated as one complete course of action, several separate courses of action, or any combination thereof. However, for purposes of clarity, the exemplary flowcharts (e.g., Flowcharts 500–700) will be discussed in accordance with Flowchart 400.

Figure 4:
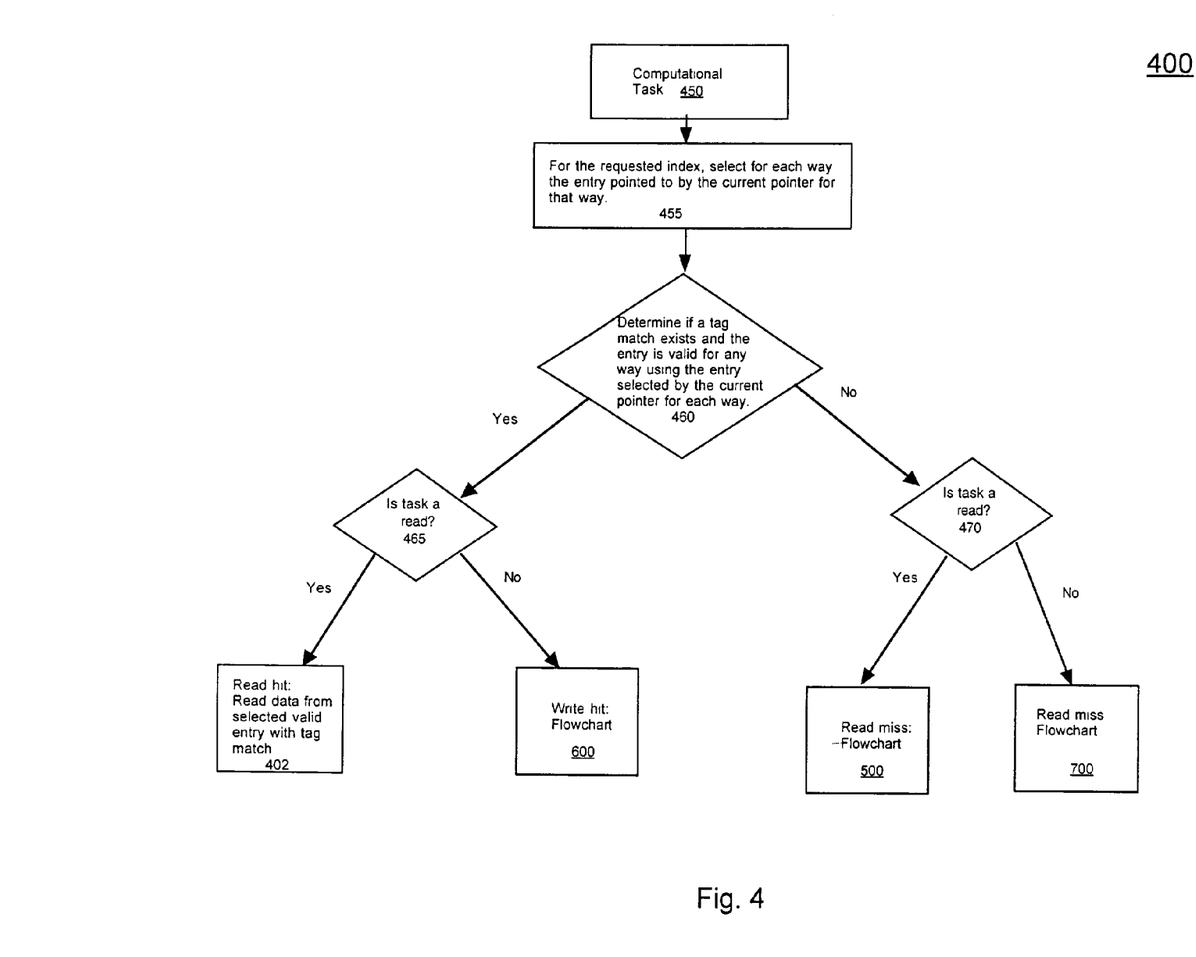
FIG. 4 is a flowchart of a method for conducting checkpointing of data within a writeback cache system in accordance with an embodiment of the present invention.

With reference now to FIG. 4, in one embodiment, the cache implements a particular write policy/strategy. Examples of the write strategy include a write through strategy and a write back strategy. In a write through cache, a write operation from the processor leads to the transfer of the data to a slower level in the memory hierarchy, which may be a cache or the main memory, even with a cache hit. Moreover, an entry in the write through cache may be written to and updated.

In a write back cache, on a write operation from the processor only the entry (on a cache hit) in the write back cache is written to and updated while the content of the slower levels of cache memory and main memory remain unaltered. The dirty (has been written to) entry of the write back cache is written-back to the slower levels of cache memory or main memory on a subsequent occasion, for example, to clean or flush the write back cache. Only after an explicit indicator or event, for example, to clean the write back cache or in certain cases of cold, capacity, conflict, or coherence misses, is the dirty or updated cache entry copied to the slower levels of cache memory or main memory to update the content there.

For example, a level 1 cache may write back to the level 2 cache, and the level 2 cache may write back to RAM 130. Alternatively, the level 2 cache may write back to a level 3 cache, etc., with the final level of cache writing back to RAM 130. Alternatively, any level of the cache memory 111 may utilize a write through policy/strategy, as long as at least one of the memory systems within the cache memory 111 utilizes a write back policy/strategy. Alternatively, the cache memory 111 may simply write back to RAM 130.

The cache may be a multi-way cache. A multi-way cache has several ways that may each contain a line that matches a requested address. The correct way is selected by comparing the tag data stored for each way to the tag portion of the address provided for a read or write to the cache. For a multi-way cache, for each index in the cache, each way for the index will implement the structures described herein to enable checkpointing. Namely, in one embodiment, for each way in the cache memory 111 there will be two banks of cache entries and two sets of pointers. The variations mentioned herein in the number of banks and current pointers are possible for alternative embodiments, as well.

With reference still to FIG. 4, when computer system 100 processes a cache task 450 an address is requested. The address comprises a tag, an index, and an offset. For the requested index, computer system 100 selects for each way the entry pointed to by the current pointer for that way (step 455). For example, if cache line 230-1 of bank 202 contains the current data and cache line 240-1 of bank 204 contains the checkpointed data, then current pointer 220-1 will direct the read to cache line 230-1 of bank 202. If the cache is a multi-way cache, for each way in the cache for the requested index, the data is read from the bank pointed to by the current pointer for that way and index. Once an entry (or set of entries for a multi-way cache) is selected, computer system 100 determines if a tag match exists and the entry is valid for any way using the entry (or entries) selected by the current pointer (or pointers) (step 460). If a match is found, then the access to the cache is classified as a hit in the cache. Otherwise, the access is classified as a miss to the cache. In one embodiment, computer system 100 then resolves whether cache task 450 is a read (step 465 or step 470).

The order of selection is not fixed and in fact some of it can be done in a different sequence or in parallel or concurrently. In the description herein, the processes are shown in a single, sequential fashion for purposes of brevity and clarity. However, the order of selections may be performed in a different sequence, or in parallel or concurrently.

If cache task 450 is a hit in cache 460 and a read 465, then the data is read from the selected valid cache entry with the matching tag (step 402).

Figure 5:
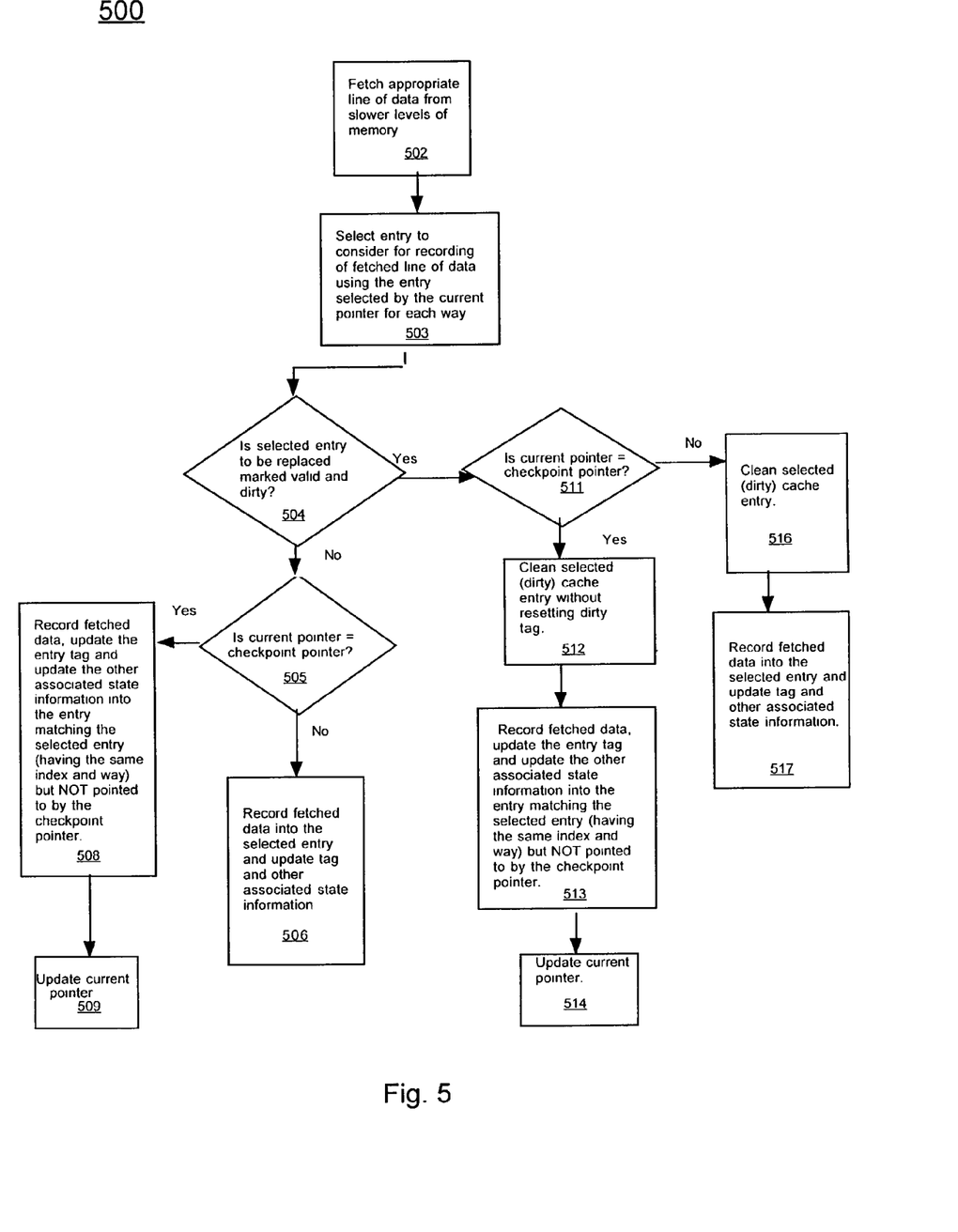
FIG. 5 is a flowchart of a method for conducting checkpointing of data within a writeback cache system in accordance with an embodiment of the present invention.

Referring now to FIGS. 4 and 5, if cache task 450 is a miss to cache 460 and a read 470 then the access to the address is directed to the slower levels of the memory hierarchy (step 500). For example, cache entry 230-1 of bank 202 could be pointed to as containing current data while cache entry 230-1 of bank 202 does not have a matching tag, is marked invalid, or the like. Once the correct data is found in the slower levels of the memory hierarchy, the slower levels return (fetch) the cache entry contents to be stored in the cache (step 502). If the cache is set associative, then a determination of a way in which to place the data is conducted, using the entries in the different ways of the set of cache lines at the appropriate index based upon the address requested and using only the entries pointed to by the current pointer for each of the different ways (step 503). Any advantageous method can be used to select one of these entries, including examining the valid/invalid, dirty/clean, and LRU or pseudo-LRU information.

Once an entry has been selected to store the data returned from the slower levels of the memory system (e.g., entry 230-1) the entry contents prior to storing the returned data must be examined. If the selected entry to be replaced is either marked invalid or is marked not dirty (step 504), then current pointer 220 is compared to checkpoint pointer 210 (step 505). If current pointer (e.g., 220-1) is not equal to checkpoint pointer (e.g., 210-1), then the fetched data is recorded into the selected entry (e.g., cache line 230-1), and the entry's (e.g., 230-1's) tag and associated state information are updated (step 506).

However, if current pointer (e.g., 220-1) is equal to checkpoint pointer (e.g., 210-1) (step 505) then the fetched data is recorded into the entry (e.g., 240-1) matching (having the same index and way) the selected entry (e.g., 230-1) but NOT pointed to by the checkpoint pointer (e.g., 220-1). The cache entry's (e.g., 240-1's) tag and associated state data are also updated to reflect the current cache entry (step 508). The current pointer will then be updated to reflect the change in the location of the current entry from the checkpointed entry (e.g., 230-1) to the new current cache entry (e.g., 240-1) (step 509).

With reference still to FIG. 2 and now to step 511 of FIG. 5, if instead the selected cache entry (e.g., 230-1) pointed to by the current pointer (e.g., 220-1) prior to storing the data returned from the slower memory is valid and dirty (step 504), then current pointer (e.g., 220-1) is compared to checkpoint pointer (e.g., 210-1) (step 511). If current pointer (e.g., 220-1) is equal to checkpoint pointer (e.g., 210-1), then the (dirty) entry contents in the cache prior to storing the returned data (e.g., 230-1) are cleaned without resetting any dirty indicator or state data in the cache tag information (step 512). The fetched data is then recorded into the cache entry (e.g., 240-1) not specified by current pointer (e.g., 220-1), and the stored cache entry's (e.g., 240-1's) tag and associated state data are also updated to reflect the newly stored cache entry (e.g., 240-1) (step 513). The current pointer (e.g., 220-1) is then updated to reflect the change in status from the checkpointed entry (e.g., 230-1) to the current cache entry (e.g., 240-1) (step 514).

However, if, at step 511, the current pointer 220-1 is not equal to the checkpoint pointer 210-1, then the dirty cache entry (e.g., 230-1) pointed to by the current pointer (e.g., 220-1) is written back (cleaned) to the slower levels of memory (step 516). Then, the fetched data is recorded into the originally specified cache entry (e.g., 230-1), and the entry's (e.g., 230-1's) tag and associated state data are updated to reflect the current cache entry (e.g., 230-1) (step 517).

Figure 6:
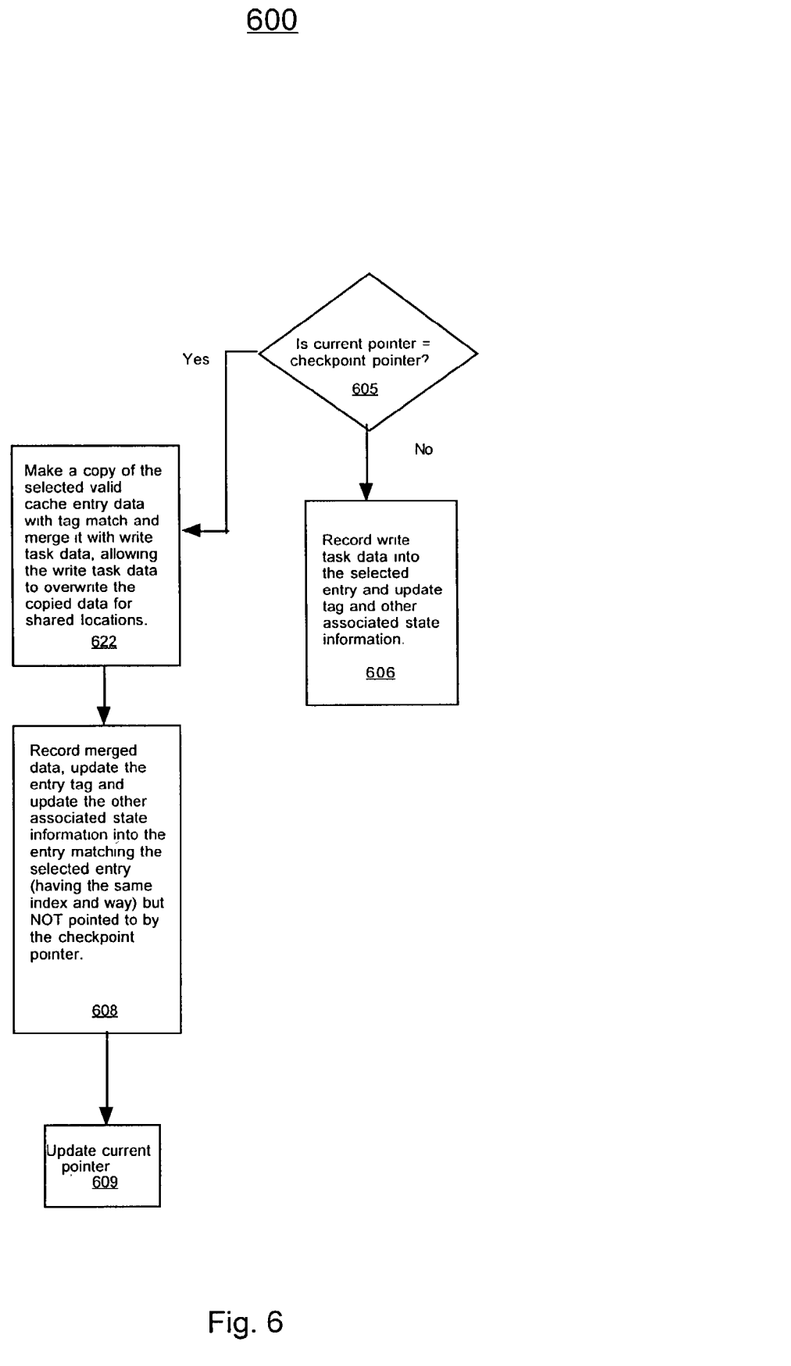
FIG. 6 is a flowchart of a method for conducting checkpointing of data within a writeback cache system in accordance with an embodiment of the present invention.

With reference now to FIGS. 4 and 6, if the task is a hit (valid tag match in step 460), and it is not a read (step 465), then it must be a write hit (Flowchart 600). In that case, the write will occur in writeback cache memory 111, for example to one of cache entries 230-1 or 240-1. In one embodiment, current pointer 220 is compared to checkpoint pointer 210 (step 605). If current pointer (e.g., 220-1) is not equal to checkpoint pointer (e.g., 210-1), then the write task data is recorded into the selected entry (e.g., cache line 230-1), and the entry's (e.g., 230-1's) tag and associated state information are updated (step 606).

However, if current pointer (e.g., 220-1) is equal to checkpoint pointer (e.g., 210-1) (step 605) then a copy of the selected valid entry data with tag match is merged with write task data, allowing the write task data to overwrite the copied data for shared locations (step 622). The merged data is recorded into the entry (e.g., 240-1) matching (having the same index and way) the selected entry (e.g., 230-1) but NOT pointed to by the checkpoint pointer (e.g., 220-1). The cache entry's (e.g., 240-1's) tag and associated state data are also updated to reflect the current cache entry (step 608). The current pointer will then be updated to reflect the change in the location of the current entry from the checkpointed entry (e.g., 230-1) to the new current cache entry (e.g., 240-1) (step 609).

Figure 7A:
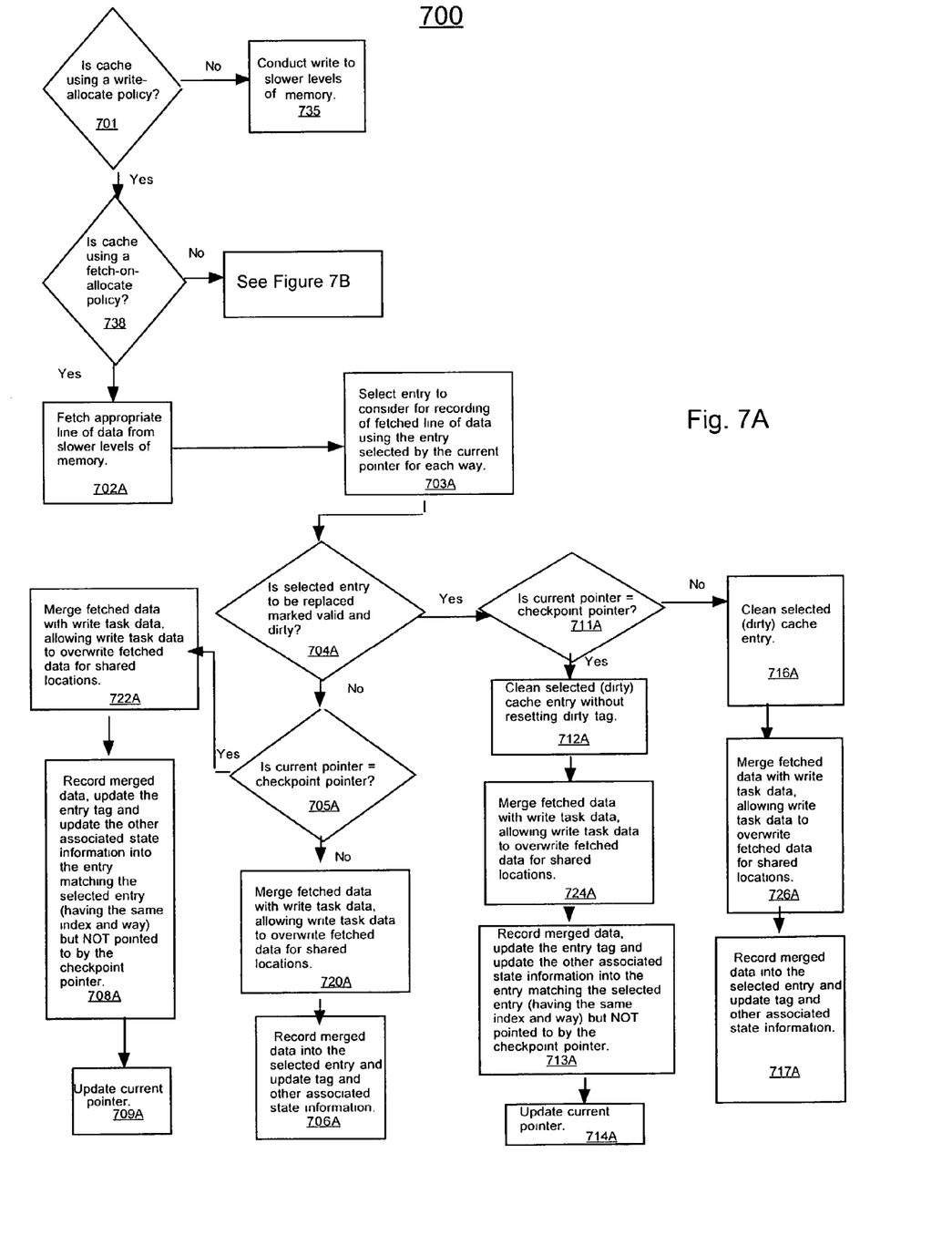
FIGS. 7A and 7B are flowcharts of a method for conducting checkpointing of data within a writeback cache system in accordance with an embodiment of the present invention.

Referring now to FIGS. 4 and 7A, if the task is a miss (no valid tag match in step 460), and it is not a read (step 470), then it must be a write miss (Flowchart 700). For example, if cache entry 230-1 of bank 202 is pointed to as containing current data and cache entry 230-1 of bank 202 does not have a matching tag, is marked invalid, or the like) then it is considered a write miss. Once a write miss occurs, the action taken is dependent upon whether cache memory 111 follows a write-allocate or a no-write-allocate policy.

Specifically, if cache memory 111 does not use a write-allocate policy (step 701 of FIG. 7A), then a write of the data to the slower levels of the memory hierarchy is conducted (step 735). However, if a write-allocate policy is used, then a further design decision will be implemented. Specifically, during write allocation, the cache is either using a fetch-on-allocate policy or not (step 738). If the cache is NOT using a fetch-on-allocate policy, then see FIG. 7B. However, if the cache is using a fetch-on-allocate policy, then the appropriate line of data is fetched from the slower levels of memory (step 702A).

Next, an entry is selected to consider for recording of the write task data merged with a fetched line of data using the entry selected by the current pointer for each way (step 703A). Any advantageous method can be used to select one of these entries, including examining the valid/invalid, dirty/clean, and LRU or pseudo-LRU information.

Once an entry has been selected to store the write task data merged with the data returned from the slower levels of the memory system (e.g., entry 230-1) the entry contents prior to storing the returned data must be examined. If the selected entry to be replaced is either marked invalid or is marked not dirty (step 704A), then current pointer 220 is compared to checkpoint pointer 210 (step 705A). If current pointer (e.g., 220-1) is not equal to checkpoint pointer (e.g., 210-1), then the fetched data is merged with write task data allowing write task data to overwrite fetched data for shared locations (step 720A). The merged data is then recorded into the selected entry (e.g., cache line 230-1), and the entry's (e.g., 230-1's) tag and associated state information are updated (step 706A).

However, if current pointer (e.g., 220-1) is equal to checkpoint pointer (e.g., 210-1) (step 705A) then the fetched data is merged with write task data allowing write task data to overwrite fetched data for shared locations (step 722A). The merged data is then recorded into the entry (e.g., 240-1) matching (having the same index and way) the selected entry (e.g., 230-1) but NOT pointed to by the checkpoint pointer (e.g., 220-1). The cache entry's (e.g., 240-1's) tag and associated state data are also updated to reflect the current cache entry (step 708A). The current pointer will then be updated to reflect the change in the location of the current entry from the checkpointed entry (e.g., 230-1) to the new current cache entry (e.g., 240-1) (step 709A).

With reference still to FIG. 2 and now to step 711A of FIG. 7, if instead the selected cache entry (e.g., 230-1) pointed to by the current pointer (e.g., 220-1) prior to storing the data returned from the slower memory is valid and dirty (step 704A), then current pointer (e.g., 220-1) is compared to checkpoint pointer (e.g., 210-1) (step 711A). If current pointer (e.g., 220-1) is equal to checkpoint pointer (e.g., 210-1), then the (dirty) entry contents in the cache prior to storing the returned data (e.g., 230-1) are cleaned without resetting any dirty indicator or state data in the cache tag information (step 712A). The fetched data is merged with write task data allowing write task data to overwrite fetched data for shared locations (step 724A). The merged data is then recorded into the cache entry (e.g., 240-1) not specified by current pointer (e.g., 220-1), and the stored cache entry's (e.g., 240-1's) tag and associated state data are also updated to reflect the newly stored cache entry (e.g., 240-1) (step 713A). The current pointer (e.g., 220-1) is then updated to reflect the change in status from the checkpointed entry (e.g., 230-1) to the current cache entry (e.g., 240-1) (step 714A).

However, if, at step 711A, the current pointer 220-1 is not equal to the checkpoint pointer 210-1, then the dirty cache entry (e.g., 230-1) pointed to by the current pointer (e.g., 220-1) is written back (cleaned) to the slower levels of memory (step 716A). Then, the fetched data is merged with write task data allowing write task data to overwrite fetched data for shared locations (step 726A). The fetched data is recorded into the originally specified cache entry (e.g., 230-1), and the entry's (e.g., 230-1's) tag and associated state data are updated to reflect the current cache entry (e.g., 230-1) (step 717A).

Figure 7B:
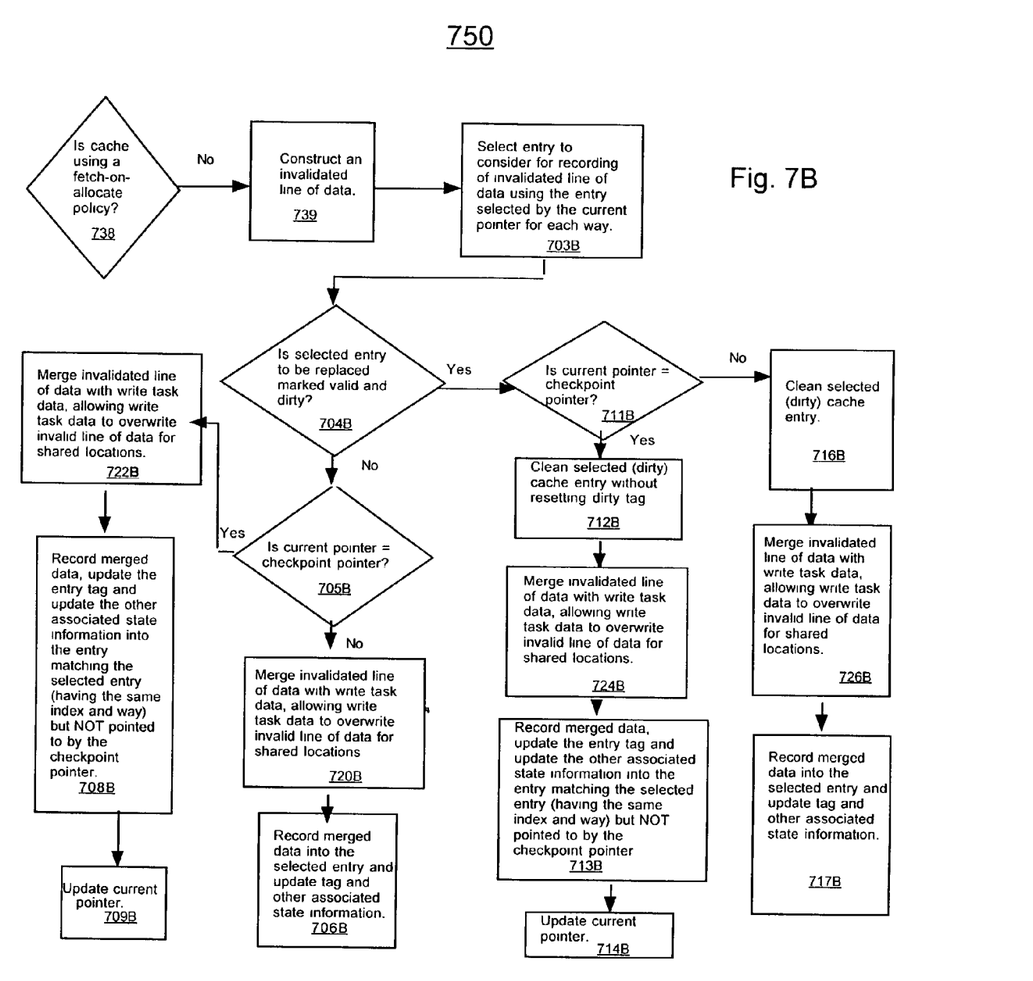

With reference still to FIG. 2 and now to FIG. 7B, during write allocation, if the cache is not using a fetch-on-allocate policy (step 738), then an invalidated line of data is constructed (step 739). In addition, an entry is selected to consider for recording of the write task data merged with the invalidated line of data using the entries selected by the current pointer for each way (step 703B). Any advantageous method can be used to select one of these entries, including examining the valid/invalid, dirty/clean, and LRU or pseudo-LRU information.

Once an entry has been selected to store the write task data merged with the invalidated line of data (e.g., entry 230-1), the entry contents prior to storing the merged data must be examined. If the selected entry to be replaced is either marked invalid or is marked not dirty (step 704B), then current pointer 220 is compared to checkpoint pointer 210 (step 705B). If current pointer (e.g., 220-1) is not equal to checkpoint pointer (e.g., 210-1), then the invalidated line of data is merged with write task data allowing write task data to overwrite the invalidated line of data for shared locations (step 720B). The merged data is then recorded into the selected entry (e.g., cache line 230-1), and the entry's (e.g., 230-1's) tag and associated state information are updated (step 706B).

However, if current pointer (e.g., 220-1) is equal to checkpoint pointer (e.g., 210-1) (step 705B) then the invalidated line of data is merged with write task data allowing write task data to overwrite the invalidated line of data for shared locations (step 722B). The merged data is then recorded into the entry (e.g., 240-1) matching (having the same index and way) the selected entry (e.g., 230-1) but NOT pointed to by the checkpoint pointer (e.g., 220-1). The cache entry's (e.g., 240-1's) tag and associated state data are also updated to reflect the current cache entry (step 708B). The current pointer will then be updated to reflect the change in the location of the current entry from the checkpointed entry (e.g., 230-1) to the new current cache entry (e.g., 240-1) (step 709B).

With reference still to FIG. 2 and now to step 711B of FIG. 7, if instead the selected cache entry (e.g., 230-1) pointed to by the current pointer (e.g., 220-1) prior to storing the write task data merged with an invalidated line of data is valid and dirty (step 704B), then current pointer (e.g., 220-1) is compared to checkpoint pointer (e.g., 210-1) (step 711B). If current pointer (e.g., 220-1) is equal to checkpoint pointer (e.g., 210-1), then the (dirty) entry contents in the cache prior to storing the merged data (e.g., 230-1) are cleaned without resetting any dirty indicator or state data in the cache tag information (step 712B). The invalidated line of data is merged with write task data allowing write task data to overwrite the invalidated line of data for shared locations (step 724B). The merged data is then recorded into the cache entry (e.g., 240-1) not specified by current pointer (e.g., 220-1), and the stored cache entry's (e.g., 240-1's) tag and associated state data are also updated to reflect the newly stored cache entry (e.g., 240-1) (step 713B). The current pointer (e.g., 220-1) is then updated to reflect the change in status from the checkpointed entry (e.g., 230-1) to the current cache entry (e.g., 240-1) (step 714B).

However, if, at step 711B, the current pointer 220-1 is not equal to the checkpoint pointer 210-1, then the dirty cache entry (e.g., 230-1) pointed to by the current pointer (e.g., 220-1) is written back (cleaned) to the slower levels of memory (step 716B). Then, the invalidated line of data is merged with write task data allowing write task data to overwrite the invalidated line of data for shared locations (step 726B). The merged data is recorded into the originally specified cache entry (e.g., 230-1), and cache entry 230-1's tag and associated state data are updated to reflect the current cache entry (e.g., 230-1) (step 717B).

In the embodiment described herein, read hit, read miss, write hit, or write miss which occur with cold, capacity, and conflict cache activity have been discussed in detail. The coherence scheme in a multiprocessor can also cause cache activity which will be handled in a fashion similar in spirit and implementation to the cache activity described herein. In particular, any coherence activity to the cache will utilize the checkpoint pointers and the current pointers to determine which data to access, which writebacks to conduct, and which data must be preserved in the current checkpoint. The details of handling coherence cache activity will depend upon the specific coherence scheme implemented in the multiprocessor, and are not described in further detail merely for purposes of brevity and clarity.

Failure of checkpointing or rollback can be made unlikely by designing the checkpoint phase and the rollback phase to be atomic (all-or-nothing). Additionally, ensuring that the pointers are fault-tolerant, perhaps by protecting them with error correction code (ECC), can provide more protection against the failure of checkpointing or rollback. However, if checkpointing or rollback cannot be completed within a single cycle, a two-stage recoverable process of copying the data to be overwritten (current or checkpoint pointer) into a temporary third bank can be utilized. In that case, the overwriting process is conducted with start and finish indicators that can indicate whether a failure occurred during checkpoint or rollback. By conducting the checkpoint or rollback again, the failure can be tolerated.

In one embodiment, checkpointing and rollback are idempotent operations, so that the process can be immediately restarted or repeated to yield the same final state. Then by using a start and a finish indicator to signal that a checkpointing operation has begun and ended respectively, an algorithm can be utilized to detect whether a checkpoint operation or rollback operation has been started or completed. In one embodiment, when a checkpoint operation is started, the start indicator is set to indicate this. When the checkpoint operation is finished, the finish indicator is set to indicate this. Once completion of the checkpointing operation has been observed or recorded, the start and finish indicators can be reset. The same method and indicators may be implemented for the rollback operation. Other methods can be implemented to enhance the fault-tolerance of the checkpointing operation, or the rollback operation, or both, especially to provide atomicity of the operations.

It is appreciated, that the system, methods, and structures described herein to provide checkpointing and rollback capability to a cache memory (e.g., cache memory 111), may also be applied to any, or to other portions of the memory system.

With reference still to step 306 of FIG. 3, extensions to the cache entry (line, tag, and associated state information) and its method of updates beyond the basic cache design may require different activities during the computation, checkpoint, or rollback/recovery phases to support checkpointing and recovery capabilities. For example, values stored in least recently used (LRU) bits that encode LRU status amongst the ways of cache memory 111 may be considered optional data that need not be recovered following a failure. In that case, LRU bit updates can be done to checkpoint data rather than only to current data that has been separated from checkpoint data, which is an extension to the method of maintaining checkpoints described herein.

Other extensions to the cache entry (line, tag, and associated state information) and its methods of updates may require protection and reinstatement after failures. In that case, before this state information is changed (even if its associated cache entry's cache line data is not changed), the current and checkpoint data may need to be separated and even copied from one bank to another. This would possibly be the case even for read hits and for write misses implementing a no-allocate-on-miss scheme. For read hits and for write misses with a basic design of cache memory 111 described herein, cache memory 111 need not modify any of its contents, and a basic model of the supporting checkpointing and recovery algorithms need not conduct any tests or activity to separate checkpoint data from current data. In one embodiment, if associated state information extensions that require recovery were implemented in cache memory 111, and if these instances of associated state information could change for read hits or write misses implementing a no-allocate-on-miss scheme, then extensions to the basic algorithms described herein to protect the checkpoint data may be necessary.

Figure 8:
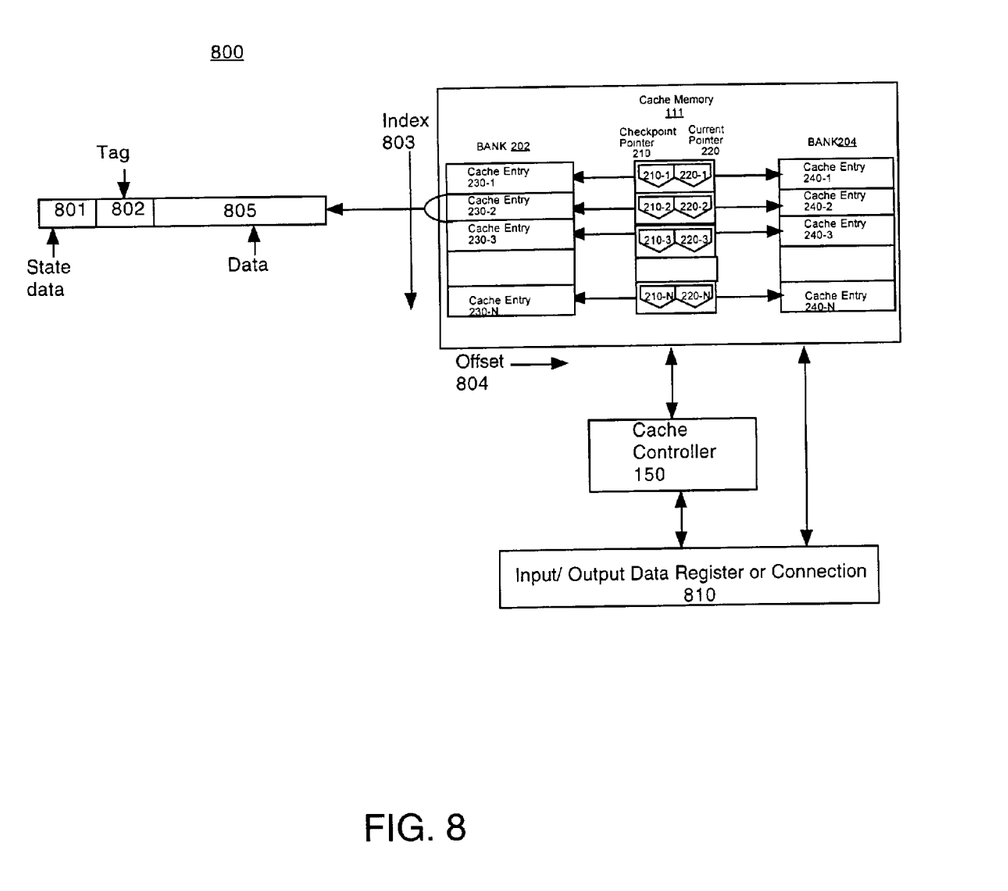
FIG. 8 is a block diagram of a writeback cache system in accordance with an embodiment of the present invention.

Referring now to FIG. 8, a block diagram of a writeback cache system is shown in accordance with an embodiment of the present invention. For example, included in a cache entry, such as entry 230-1, may be data 805, a tag 802 and other associated state data 801. As stated herein, other associated state data 801 may identify whether the entry is valid or invalid, shared or exclusive, dirty or clean, least recently used, or the like. Other associated state data 801 may be used to determine the status of all of, or a portion of, the data 805 within a cache entry. Tag 802 may be a bit or set of bits found within the cache entry that identifies whether or not the cache entry matches a requested address.

In one embodiment, an index 803 and offset 804 are used for navigating through multiple entries of a cache. Index 803 is used to select a specific cache entry, such as cache entry 230-1, and tag 802 is utilized to identify whether the cache entry (e.g., 230-1) matches the requested address to be accessed. The offset is used to specify a location within the cache entry to search for the data to be accessed. In a multiple way cache, index 803 may identify an entry per way. In such a case, tag 802 for each cache entry per way is accessed to find the desired data 805.

With reference still to FIG. 8, the flow of data between an input/output register or connection 810 and a portion of cache memory 111 is shown. As stated herein, the activity may be due to a read hit or miss, or a write hit or miss, or other cache activity. Initially, a request is made to controller 150 to read or write a specific address. By considering a combination of one or more of the address requested, the task that caused the address request, the nature of the address request (e.g., read or write), the design of the cache, the cache entries, the checkpoint pointers, the current pointers, and other information, the controller selectively stores a portion of the data from the input/output data register or connection 810 into a specific entry (e.g., 230-1) or reads data from a specific entry (e.g., 230-1) and stores a portion of that data into the input/output data register or connection 810. During the process, cache controller 150 may also copy or modify (or both) a cache entry 230 or 240, or a current pointer 220, or a checkpoint pointer 210. Alternatively, the input/output data register or connection 810 may directly access cache memory 111, for example, to tolerate a failure in cache controller 150. In one embodiment, the input/output data register or connection 810 is identical to bus 175 of FIG. 1 or FIG. 2. Alternative embodiments of the input/output data register or connection 810 are discussed herein.

Therefore, a method for conducting a checkpoint within a writeback cache is disclosed. The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for conducting checkpointing of data within a writeback cache having a cache memory with at least two memory banks, said method comprising:
   setting a first pointer to indicate which cache entry of said at least two memory banks contains current data;
   setting a second pointer to indicate which cache entry of said at least two memory banks contains checkpoint data; and
   checkpointing by selectively controlling said second pointer or said first pointer.

2. A method as recited in claim 1 further comprising:
   utilizing a controller to control the operations of said cache memory.

3. A method as recited in claim 2 wherein said checkpointing by selectively controlling said second pointer or said first pointer is performed by said controller.

4. A method as recited in claim 1 wherein said checkpointing by selectively controlling said second pointer or said first pointer is performed within said cache memory.

5. A method as recited in claim 1 wherein said checkpointing is performed without cleaning dirty data to another memory and without cleaning dirty data to a disk storage and without cleaning dirty data to a network storage device.

6. A method as recited in claim 1 wherein said checkpointing by selectively controlling said second pointer or said first pointer is performed within a single cache clock cycle.

7. A method as recited in claim 1 further comprising:
   performing a rollback by selectively controlling said first pointer or said second pointer.

8. A method as recited in claim 7 wherein said rollback by selectively controlling said second pointer or said first pointer is performed within a single cache clock cycle.

9. A method as recited in claim 1 further comprising:
accessing a start indicator;
accessing a finish indicator;
setting a third pointer to store the value of said first pointer or said second pointer; and
enabling an atomic multi-cycle checkpoint or rollback operation wherein said start indicator indicates the initiation of said atomic multi-cycle checkpoint or rollback operation, said finish indicator indicates the completion of said atomic multi-cycle checkpoint or rollback operation, and said third pointer stores the initial value of said first pointer or said second pointer which will be overwritten by the completion of said atomic multi-cycle checkpoint or rollback operation.

10. A method as recited in claim 1 further comprising:
accessing a portion of said at least two memory banks with a component selected from the group consisting of a processor within said cache memory, a processor external to said cache memory, a controller, a bus, and another portion of a memory system.

11. A method as recited in claim 10 further comprising:
allowing said component access to a dirty line within said at least two memory banks; and
permitting said component access to said first pointer or said second pointer.

12. In a computer system including a processor coupled to a bus, and a memory unit coupled to the bus for storing information, a computer-implemented method for conducting checkpointing of data within a writeback cache having a cache memory with at least two memory banks, said method comprising:
accessing a first pointer, said first pointer indicating which cache entry of said at least two memory banks contains current data;
accessing a second pointer, said second pointer indicating which cache entry of said at least two memory banks contains checkpoint data;
checkpointing or performing a rollback by selectively controlling said first pointer or said second pointer.

13. A computer-implemented method as recited in claim 12 wherein said checkpointing by selectively controlling said second pointer or said first pointer is performed within a single cache clock cycle.

14. A computer-implemented method as recited in claim 12 further comprising:
controlling the operations of said cache memory with a cache controller.

15. A computer-implemented method as recited in claim 14 wherein said cache controller is within said cache memory.

16. A method as recited in claim 12 wherein said checkpointing is performed without cleaning dirty data to another memory and without cleaning dirty data to a disk storage and without cleaning dirty data to a network storage device.

17. A method as recited in claim 12 further comprising:
accessing a portion of said at least two memory banks with a component selected from the group consisting of a processor within said cache memory, a processor external to said cache memory, a controller, a bus, and another portion of a memory system.

18. A method as recited in claim 17 further comprising:
permitting said component access to a dirty line within said at least two memory banks;
allowing said component access to said first pointer or said second pointer.

19. A computer-readable medium having stored therein a computer program that when executed implements a method for conducting checkpointing of data within a writeback cache having a cache memory with at least two memory banks and a cache controller, said method comprising:
setting a first pointer to indicate which cache entry of said at least two memory banks contains current data;
setting a second pointer to indicate which cache entry of said at least two memory banks contains checkpoint data;
checkpointing or executing a rollback by selectively controlling said first pointer or said second pointer.

20. The computer-readable medium of claim 19 wherein said checkpointing by selectively controlling said first pointer or said second pointer is performed within a single cache clock cycle.

21. The computer-readable medium of claim 19 wherein checkpointing by selectively controlling said first pointer or said second pointer is performed within said cache memory.

22. The computer-readable medium of claim 19 wherein said checkpointing by selectively controlling said first pointer or said second pointer is performed without cleaning dirty data to another memory and without cleaning dirty data to a disk storage and without cleaning dirty data to a network storage device.

23. The computer-readable medium of claim 19 wherein said method further comprises:
allowing a portion of said at least two memory banks to be accessed with a component selected from the group consisting of a processor within said cache memory, a processor external to said cache memory, a controller, a bus, and another portion of a memory system according to a value of said first pointer or according to a value of said second pointer or according to a value of an entry.

24. The computer-readable medium of claim 23 wherein said method further comprises:
allowing said component access to a dirty line within said at least two memory banks.

25. A writeback cache system comprising:
a first memory bank containing a first cache entry;
a second memory bank containing a second cache entry;
a first pointer to indicate whether said first cache entry or said second cache entry contains current data; and
a cache controller communicatively coupled with both said first memory bank and said second memory bank;
said cache controller utilized to discriminate between said first cache entry and said second cache entry.

26. The writeback cache system of claim 25 further comprising:
a second pointer to indicate whether said first cache entry or said second cache entry contains checkpointed data.

27. The writeback cache system of claim 26 wherein said cache controller controls whether a reading operation or a writing operation is performed on current data or checkpointed data.

28. The writeback cache system of claim 25 wherein said cache controller controls an operation of said first memory bank or said second memory bank within a cache memory.

29. The writeback cache system of claim 25 wherein said first cache entry or said second cache entry further comprise:
a line of data corresponding to at least one memory address;
a tag; and
other associated state data.

* * * * *